United States Patent [19]

Smeyers

[11] Patent Number: 4,682,730

[45] Date of Patent: Jul. 28, 1987

[54] DISTRIBUTOR OR DRIPPER FOR THE MICRO-IRRIGATION OF SOILS

[75] Inventor: Pierre A. Smeyers, Brussels, Belgium

[73] Assignee: Raymond J. Nakachian, Saudi Arabia; a part interest

[21] Appl. No.: 854,623

[22] Filed: Apr. 22, 1986

Related U.S. Application Data

[62] Division of Ser. No. 580,998, Feb. 16, 1984, Pat. No. 4,623,094.

[30] Foreign Application Priority Data

Feb. 22, 1983 [BE] Belgium .................................. 210175

[51] Int. Cl.$^4$ .......................... A01G 25/02; B05B 1/32
[52] U.S. Cl. ..................................... 239/109; 239/542
[58] Field of Search ...................... 239/109, 533.1, 542

[56] References Cited

U.S. PATENT DOCUMENTS

| | | | |
|---|---|---|---|
| 3,061,199 | 10/1962 | Billeter | 239/109 |
| 3,908,694 | 9/1975 | Spears | 239/542 X |
| 4,223,838 | 9/1980 | Maria-Vittorio-Torrisi | 239/109 |

Primary Examiner—Andres Kashnikow
Attorney, Agent, or Firm—Sughrue, Mion, Zinn, Macpeak and Seas

[57] ABSTRACT

A distributor or dripper includes a housing in which a closing member is movable from a seat adjacent an inlet to a seat adjacent an outlet. When in contact with the seat adjacent the outlet, the closing member forms with the housing a restricted flow channel. Prior to the point at which the closing member contacts the seat adjacent the outlet, a filter is formed which is maintained while the closing member continues movement toward the outlet.

25 Claims, 17 Drawing Figures

DISTRIBUTOR OR DRIPPER FOR THE MICRO-IRRIGATION OF SOILS

This is a division of application Ser. No. 580,998 filed 2-16-84, now U.S. Pat. No. 4,623,094.

PRIOR ART

Micro-irrigation is a known method in which distributors placed in predetermined areas of a cultivated surface and connected to a system of supply of water under pressure continuously or periodically bring irrigation water to which are possibly added fertilizers or phyto-pharmaceutical products to said areas, so that the irrigation water is only brought to the growing areas of the roots or rootlets of seeds or plants, where the latter need water.

It is known to use, for the micro-irrigation of soils, distributors which dispense water drop by drop or in the form of microjets, these distributors being particularly drippers which may either be provided with a long circuit comprising possibly capillary ducts which have a rectilinear, helical or spiral shape or are provided with deflectors, or with a short circuit having a single or double opening, said drippers being sometimes self-regulating, i.e. able to discharge constant amounts of liquid, even if the water pressure varies in the water supply system.

These known drippers may be mounted on branches of a supply tube, or in line in said tube.

A particular known dripper of the short circuit type comprises a chamber provided with an inlet and an outlet, between which a closing or valve element, for example a ball, may be moved by the stream of liquid created in the chamber by a variation of the pressure to which the liquid is submitted. In the normal position, the dripper is mounted on branches of a liquid supply tube, in a vertical position, the outlet being on the upper side, so that, when no water is admitted into the inlet, the closing element rests by gravity on a lower seat around said inlet.

When pressure is applied in the supply tube or conduit, water enters into the inlet and removes the closing element from its lower seat. The closing element driven by the water flow then closes the outlet, by becoming seated on the upper seat formed around said outlet. One or more grooves provided in the upper seat allow a dropping of water when the closing element is applied on said upper seat.

During the displacement of the closing element from one seat to the other, a fraction of water under pressure may escape through the outlet, so as to rinse and clean the seat of the latter, as well as the groove or grooves used for discharging the water drop by drop. When the water supply is stopped, for example by closing a cock or valve on the supply conduit, so that no water is admitted into the latter, the water pressure decreases in the chamber of the dripper and the closing element becomes applied by gravity onto the seat of the inlet. A dripper of this type cannot be placed in any position, since it works only when it is in a vertical position.

Such a drawback does not exist in another known dripper, in which the ball-shaped closing element has been replaced by a valve element maintained on the inlet by a spring, the pressure of the latter being less than the water pressure, when water is supplied to the supply tube or conduit.

A common drawback of the two known drippers of the short circuit type described above is that they have a tendency to become clogged.

U.S. Pat. No. 4,059,228 also describes a self-regulating and self-cleaning dripper, in which the closing element, which may have a cylindrical or frusto-conical shape, must counteract the effects of a counterpressure for closing the outlet. Moreover, the part of the closing element acting as a filter and as a piston has the disadvantage of retaining impurities upstream the envelope or housing in which the closing element is movable. When the liquid supply source is closed and the supply tubes of the drippers are not fed with water, the closing element never completely closes the inlet so that, in the closed position, the drippers allow a complete draining of the water contained in the supply tubes of said drippers, so that an important amount of water is lost. Such a loss of water is particularly detrimental in deserts, where the loss of even small amounts of water cannot be admitted.

Moreover, the drippers disclosed in U.S. Pat. No. 4,059,228 as well as the known earlier described drippers must be arranged in complex circuits comprising a large filtering system.

Even when the water or irrigation liquid is filtered on filters retaining relatively small particles, there is still a danger that the individual drippers become clogged. Therefore, the potential users of drippers frequently hesitate to use them, since they become useless and must be replaced or cleaned when they become clogged.

OBJECTS OF THE INVENTION

It is an object of the present invention to provide a dripper which is reliable for a long time, i.e. which is particularly able to operate correctly during long periods, without choking or clogging.

Another object of this invention is to provide a dripper or microjet distributor of the self-filtrating type, i.e. a device which is provided with means retaining particles of predetermined size during its operation, so that such particles cannot obstruct said dripper.

Still another object of this invention is to provide a dripper provided with means for cleaning the filter contained in it, by removing the particles retained by said filter, such a self-cleaning taking place during the displacement of the closing element between its opening and closing positions and vice-versa.

Another object of the invention is to provide drippers adapted so as to maintain the water supply tubes full of water when the drippers are not in use, said drippers being adapted for avoiding the drainage of the supply conduit when the closing element closes the inlet of the dripper.

Finally, another object of the invention is a dripper adapted to inhibit any reflux of water possibly loaded with impurities, by aspiration of this water into the supply or feeding tube of the dripper, under the influence of a depression caused by a level difference between the dripper and a part of its supply tube.

BRIEF DESCRIPTION OF THE INVENTION

This invention relates to a distributor or dripper for the micro-irrigation of soils comprising an envelope or housing for a chamber provided with an inlet (to be connected to a conduit of an irrigation liquid under pressure) and with an outlet, and a closing element having the shape of a revolution body, which is contained in said chamber and is movable, under the influence of a liquid stream, between seats formed in the chamber and respectively adjacent to said inlet and outlet, as well as means for returning the closing element onto its seat adjacent to the inlet.

The dripper according to this invention is essentially characterized by the fact that it is provided with a circular array of notches through which the irrigation liquid can flow, but which retain particles of predetermined size present in said liquid when the closing element is applied on the seat adjacent to the outlet, the closing element being adapted so that the particles retained by said filtering notches are removed through the outlet by the rinsing effect caused by said liquid during the displacement of the closing element from the seat adjacent to the outlet toward the seat adjacent to the inlet in said chamber and vice-versa.

Said notches which may be V- or U-shaped or have the shape of slots can be provided, in accordance with the invention, in the periphery of the part having the largest diameter of the closing element, or in the edge of a circular hole provided in a membrane carried by the seat adjacent to the outlet of said envelope.

According to an important feature of the invention, the closing element or the membrane, which may at least partly be made of an elastic material, is provided downstream of the notches, with a groove which forms a continuous channel having such a profile that the liquid flowing therein is subjected to several direction changes, one end of said groove having an opening directed toward the inlet, whereas the other end of said groove has an opening directed toward the outlet. Said groove may also be provided in the seat adjacent the outlet.

The closing element is preferably frusto-conical and has its great base facing the inlet, whereas the seat adjacent to the outlet is also frusto-conical, the apex of the angle generating said outlet seat being equal to the apex of the frusto-conical closing member or element, the latter being preferably provided, in its part of greatest diameter, with a flexible lip having a peripheral edge wherein said notches are separated from each other by teeth.

In another embodiment of the dripper according to the invention, in which the abovesaid membrane is used, this membrane has a frusto-conical shape and is permanently applied on the frusto-conical seat which is adjacent to the outlet of the envelope, this membrane being provided, in its part of greatest diameter, with a circular hole, the edge of which is provided with said notches separated from each other by teeth.

The closing member is provided with a shank guided in a sheath provided in said envelope downstream the inlet of the chamber, the shank being provided, at least on part of its height, with substantially radial or helical fins and, at its free end, with a conical head.

The means for returning the closing element toward the seat adjacent to the inlet may consist either of a magnet acting on a ferromagnetic material or of radial elastic arms which act as a spring and have one end fixed to the closing element, whereas the free ends of said elastic arms are supported by a circular recess of the envelope of the dripper. The radial elastic arms permanently pull the closing element toward the seat adjacent to the inlet, while inhibiting the flowing of said liquid through the dripper, as long as the pressure of this liquid is lower than a value determined by the elasticity of the radial arms.

DETAILED DESCRIPTION OF THE INVENTION

The following detailed description discloses, only by way of examples, five embodiments of a dripper according to this invention.

BRIEF DESCRIPTION OF THE DRAWINGS

In the attached drawings.

In the various figures, the same references are used for designating identical or similar elements.

DETAILED DESCRIPTION OF THE PREFERRED EMBODIMENT

Figure 1:
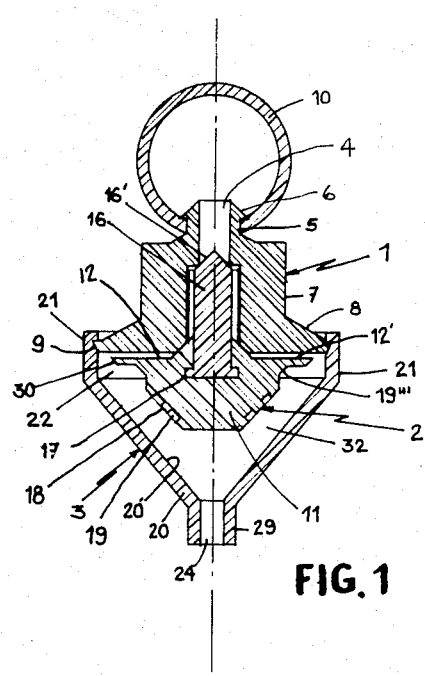
FIGS. 1, 2 and 3 are cross-sections of a first embodiment of a dripper showing the closing element in three different positions.

The drippers shown on the drawings essentially comprise three parts 1, 2 and 3, said parts being assembled by snapping, although they may be assembled by other means, for example by screwing or by welding.

Part 1 is a cover provided with an inlet 4 and comprising a neck 5 having a bevelled part 6 and a cylindrical body 7, acting as a sheath, which is fixed to the neck 5. At its end opposite to the neck 5, the sheath 7 has a peripheral flange 8 having a bevelled edge 9 in FIGS. 1 to 3.

Part 1 is attached by the bevelled end 6 of the neck 5 to a hole provided in a supply tube or conduit 10 which is itself connected to a source (not shown) supplying an irrigation liquid under pressure, a valve or a cock (not shown) being able to stop the liquid supply.

In the first embodiment of the dripper shown in FIGS. 1 to 6, the cylindrical body 7 of part 1 is preferably made of plastic material and is magnetized, magnetized particles being dispersed in said body 7, so that the latter is a permanent magnet. Instead of a permanent magnet, an electromagnet could possibly be used.

Piece 2 is the closing member or element of the dripper and comprises a revolution body 11 made of flexible elastic plastic material, such as a silicone resin or polytetrafluorethylene.

In the embodiment shown in FIGS. 1 to 6, the revolution body 11 has substantially the shape of an inverted cone frustum, the large base 12 of which is directed toward the inlet 4 of part 1.

The base 12 of the revolution conical body 11 has a central frusto-conical projection 13 intended to be applied on a bevelled end 14 of a bore 15 in the body 7, the bevelled end 14 constituting the seat of the inlet 4,15 of part 1.

The closing member 11 carries a cylindrical shank 16 made of a magnetic material or sensitive to a magnetic field or made of a material containing ferromagnetic particles. The shank 16 is engaged in the bore 15 of the sheath 7 of part 1, so as to be submitted to the permanent attraction force of the magnetized body 7. An end part provided with a flange 17 of the shank 16 is inserted in the frusto-conical closing member 11.

Figure 4:
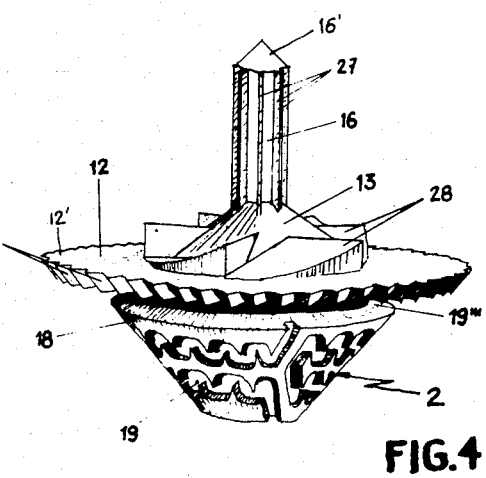
FIG. 4 is a perspective view showing an embodiment of the closing element of a dripper according to this invention.
Figure 13:
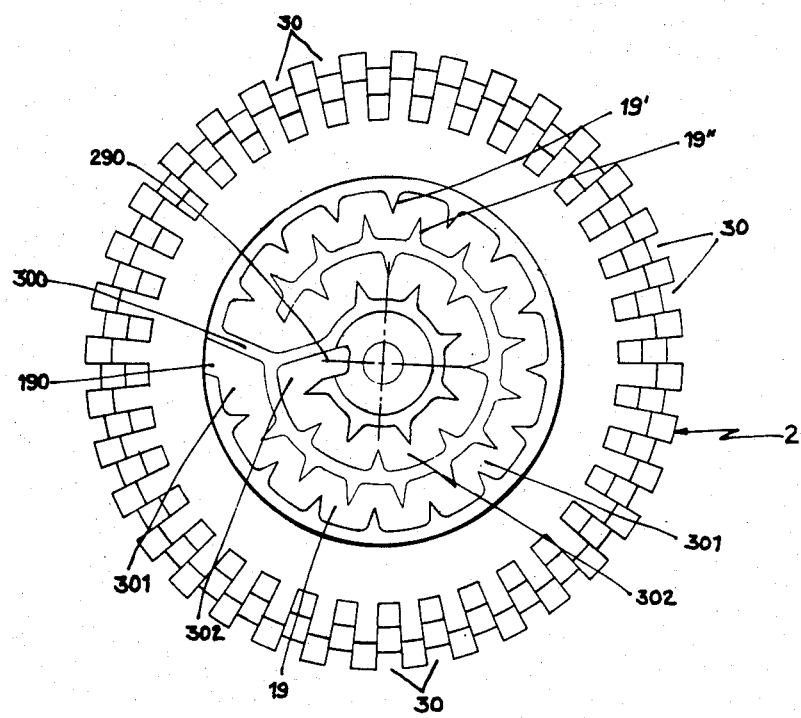
FIG. 13 is a plane view from below of the lower part of the closing element.

The side surface 18 of the closing member 11 is provided with a groove 19 having a sinuous shape, as shown in perspective in FIG. 4 and in plane in FIG. 13. This groove 19 forms a continuous channel which imposes to the liquid flowing therethrough numerous direction changes, as shown by the turning points 19',19" shown in FIG. 13. The groove 19 has an inlet 190 adjacent the large base 12 of the cone frustum and an outlet 290 in the vicinity of its small base.

In the embodiment shown in FIG. 13, the groove 19 has a return point shown by a wall 300, so that said groove 19 comprises two branches 301,302 which are substantially parallel to each other and which are interconnected along the wall 300. In the embodiment shown in FIG. 4, the groove 16 is provided in the body 11 by cutting it perpendicularly to the lateral surface 18 of said body, but it is preferred to realize said groove as shown in FIGS. 7 to 12 and 15, wherein the bottom 19' of the channel is oriented toward the bottom 20' of the cone frustum, the axis of the cross-section of the groove being parallel to the axis of the closing element.

An essential part of the closing member 11 is constituted by the edge of the large base 12 of said frusto-conical member 11. Said edge comprises a lip 12', in which are provided the notches 30 which appear also in FIG. 8. The lip 12' is preferably flexible. Below the lip 12', the closing element 11 has a peripheral groove 19''' acting as a chamber connected to the sinuous groove 19.

In the embodiment of the closing element 11 shown in FIG. 4, this element comprises moreover, between its central frusto-conical projection 13 and its base 12 provided with the lip 12', a series of inclined surfaces 28 which form blades. The projection 13 carrying the shank 16 is provided at its periphery with radial fins 27 and carries a conical head 16'. The function of the elements 27 and 28 will be explaind hereafter.

Part 3 of the dripper is the envelope of the latter. It comprises a cylindrical upper edge 21 defining an inner chamber 22, a hollow frusto-conical part 20 forming the seat adjacent to the outlet of the dripper and a cylindrical end part 29 surrounding the outlet 24.

The closing element 11 is located within the envelope 20 and, in its lower position, its lateral surface 18 is applied against the inner lateral surface or seat 20' of part 20.

The operation of the first embodiment of the dripper is explained hereafter with reference to FIGS. 1 to 6.

In a first stage, where no water pressure exists in the conduit 10, the closing element 11 is applied on its upper seat 14 by the attraction exerted by the magnetized sheath 7 on the shank 16 of the closing element 11. The inlet 4,15 is closed and no irrigation liquid can flow into the dripper through the inlet 4.

Figure 2:
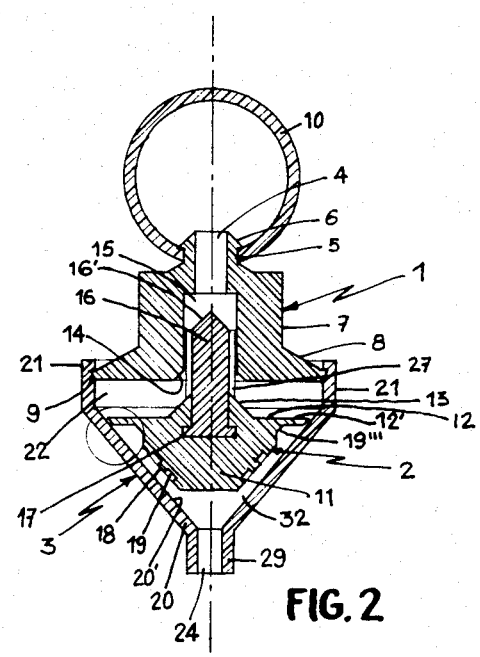

When a pressure is created in the conduit 10 and acts sufficiently in the conical head 16' of the shank 16, the magnetic force of the magnet is exceeded and the closing element 11 is removed from its seat 14 and becomes closer to the lower part of the envelope 20. This situation is shown in FIG. 2. Water flows then all around the closing element 11, beyond the edge of the lip 12 and through the notches 32, as well as along the edges of the groove 19, the water dripping finally through the outlet 24. During this operation, the liquid sweeps the particles which have been deposited during a previous operation in the chamber 22 and on the inner surface 20' of the envelope 3.

Figure 3:
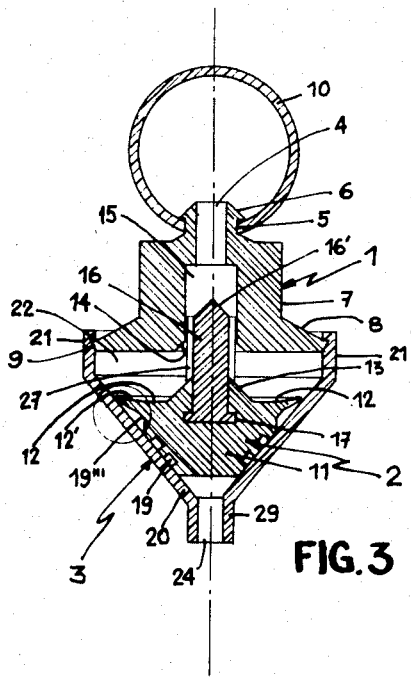
Figure 5:
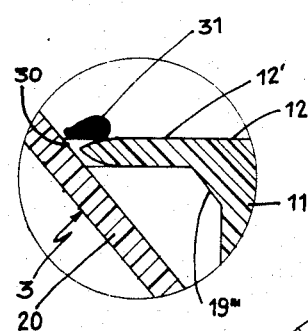
FIG. 5 is, at a larger scale, a view of a part, surrounded by a circle, at FIG. 2.
Figure 6:
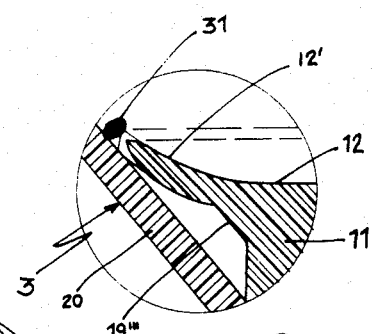
FIG. 6 is, also at a larger scale, a view of a part, surrounded by a circle, at FIG. 3.

The closing element 11, the peripheral lip 12' of which has a diameter comprised between the diameter of the large base and that of the small base of the frusto-conical envelope, becomes then seated through said lip 12' on the seat formed by the inner wall 20' of the part 20 of the envelope 3. This situation is shown in FIG. 3. Although the lip 12' is deformed, the notches 30 still allow the flow of liquid therethrough, but stop the particles 31 contained in the liquid which are too big, as shown in FIGS. 5 and 6. This shows the self-filtering effect of the dripper according to this invention. The liquid which has passed through the filtering notches 30 and arrives in the passage 32, enters then into the groove 19 through its inlet 190, flows slowly along said groove and leaves the latter through its outlet 290, from where the liquid goes into the outlet 24, from which it flows drop by drop or as a microjet.

The fins 27 and the blades 28 act during the movement of the closing element 11 from the closed position shown in FIG. 1 toward the position shown in FIG. 2. The fins 28 act as the blades of a turbine and cause a rotation of the closing element 11 about its symmetry axis. Such a rotation changes each time the position of the closing element 11 with respect to the part 20 of the envelope 3. Another function of the rotation of the closing element 11 is the scraping by the fins or blades 27 of the inner walls of the inner passage 15 of the sheath 7, so as to remove particles possibly deposited on said walls.

Figure 7:
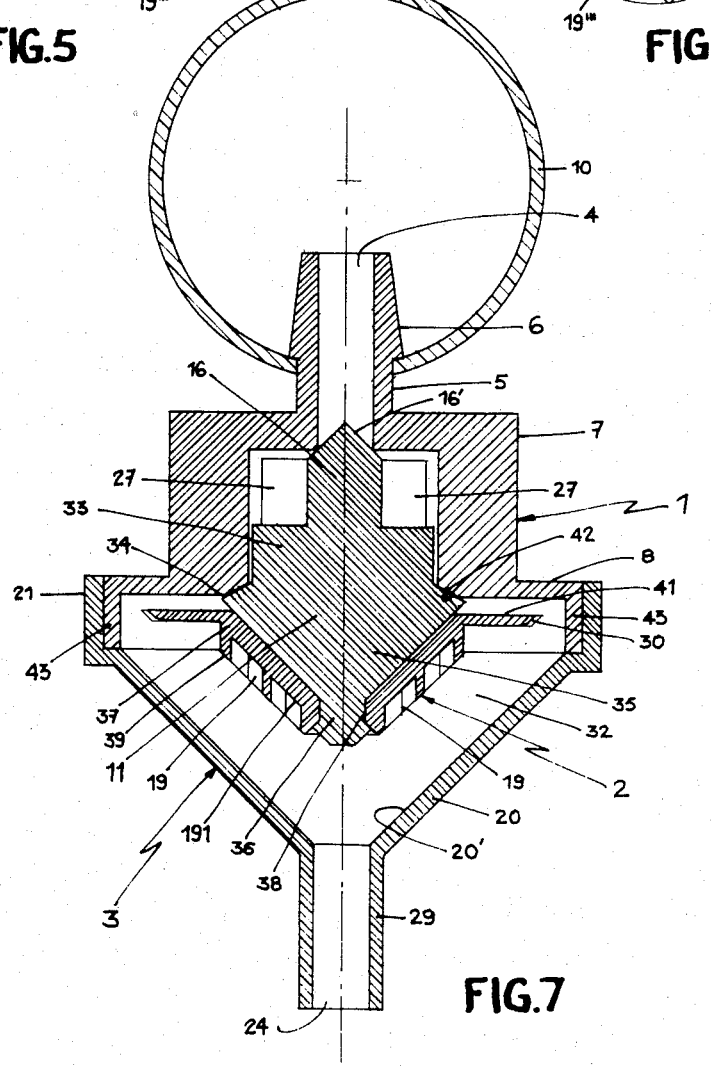
FIG. 7 is a cross-section of a second embodiment of a dripper according to the invention.
Figure 8:
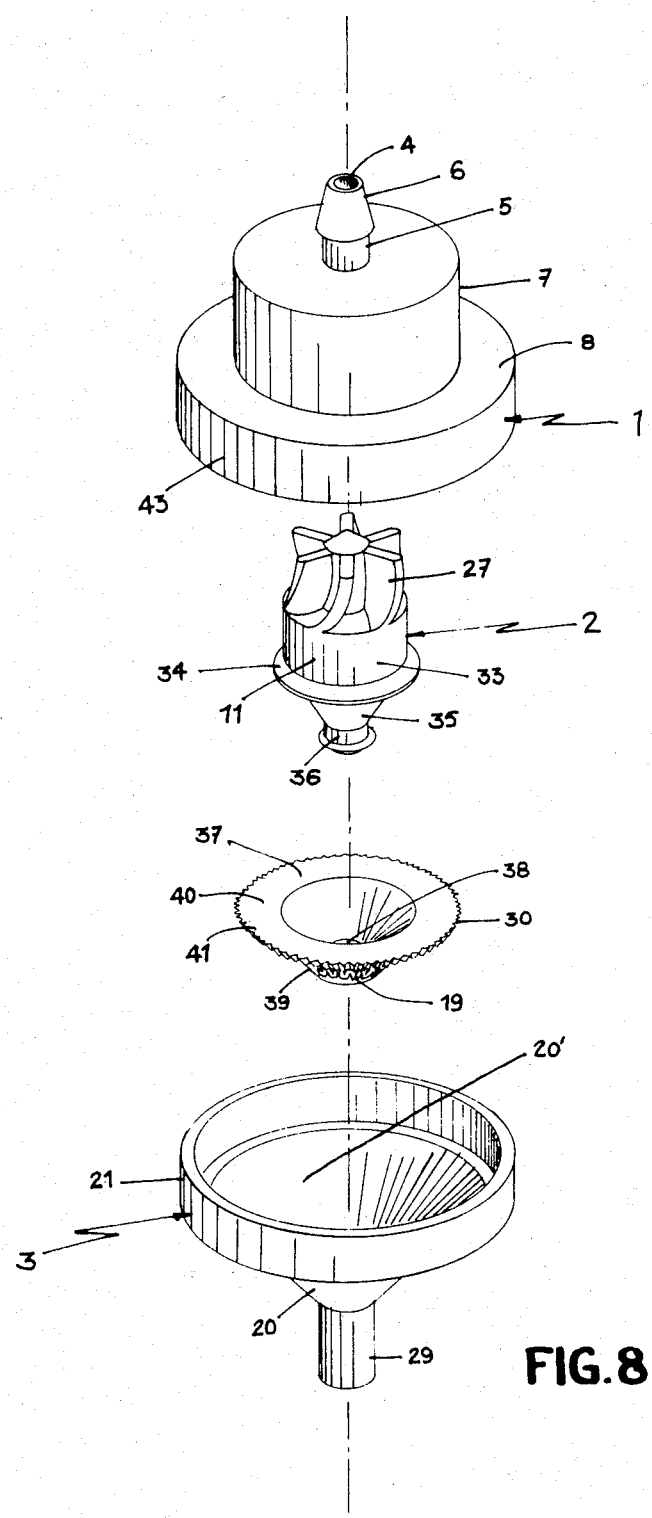
FIG. 8 is an exploded perspective view of the dripper shown in FIG. 7.

FIGS. 7 and 8 show a second embodiment of the dripper according to the invention. The same references are used for designating similar parts of the device, which correspond to parts already described in connection with the first embodiment shown in FIGS. 1 to 6. In FIGS. 7 and 8, the part 2 of the dripper comprises a closing element 11 containing ferro-magnetic particles or consisting of a ferro-magnetic material. The closing element 11 comprises an upper cylindrical part 33 connected through an intermediate frusto-conical part 34 to a lower part 35 having the shape of an inverted cone frustum, said lower part 35 being connected to a cylindrical-conical projection 36.

The closing element 11 carries an upper shank 16 provided with peripheral helical blades 27 and with a conical head 16'.

The closing element 11 is guided by its cylindrical part 33 in the chamber 15 provided in the cylindrical body 7, consisting of a magnet or containing magnetized particles, of part 1 of the dripper. The head 16' of the shank 16 seals perfectly the chamber 15 from the inlet 4, as shown in FIG. 7, when the dripper is closed.

An elastic and flexible membrane 37 is fixed, as shown particularly in FIG. 8, on the frusto-conical lower part 35 of the closing element 11. This membrane 37 has the shape of a cup having the shape of an inverted cone frustum provided at its lower end with a hole 38, so as to allow to fix it on the projection 36 of the closing element 11. The membrane 37 has a side wall 39 having the shape of an inverted cone frustum which is applied on the frusto-conical part 35 of the closing element 11. At its upper part, the membrane 37 is provided with an annular flange 40 having a peripheral lip or edge 41, in which filtering notches 30 are cut. A sinuous groove 19 similar to that illustrated in FIGS. 4 and 13 is provided in the side wall 39 of the membrane 37.

The dripper shown in FIGS. 7 and 8 operates in the same manner as the dripper of FIGS. 1 to 6. The sealing of the closing element 11 with respect to the inlet 4 and conduit 10 is provided at the level of the head 16' of the shank 16 as well as at the level of the frusto-conical intermediate part 34 of the closing element 11, said part 34 being applied on a lower bevelled edge 42 of the chamber 15 (open at its lower end) of the cover 1. As shown in FIGS. 7 and 8, the peripheral flange 8 of the cover 1 is provided with a peripheral skirt 43 which may be fixed, for example by screwing, into the cylindrical upper flange 21 of the dripper envelope 3.

FIGS. 9 to 12 and 14 show a third embodiment of the dripper according to this invention. The parts of said third embodiment which correspond to parts of already described embodiments are designated by the same reference numerals. In the third embodiment, the central shank 16 of the closing element 11 is no more a magnetized or magnetizable body, as well as the sheath 7 of the cover 5, 7, 8. The function of retaining the closing element 11 onto the inlet 4 is effected by other means, as described hereafter.

The dripper shown in FIGS. 9 to 12 and 14 is similar to that of FIGS. 7 and 8, except that it comprises a closing element 11 which is not ferro-magnetic or does not contain ferro-magnetic particles, whereas the cover 1 does not comprise a permanent magnet. The means for returning the closing element 11 toward the closed position of the dripper (shown in FIG. 9) are elastic radial arms 44, the free ends of which are supported in an annular recess 45 provided in the upper portion of the envelope 3.

The elastic radial arms 44 fixed to the parts 34,35 of the closing element 11 permanently urge said closing element 11 toward the seat adjacent to the inlet 4, so as to inhibit any liquid flow through the dripper, as long as the pressure of this liquid in the conduit 10 is lower than a value determined by the elasticity of the radial arms 44.

Figure 9:
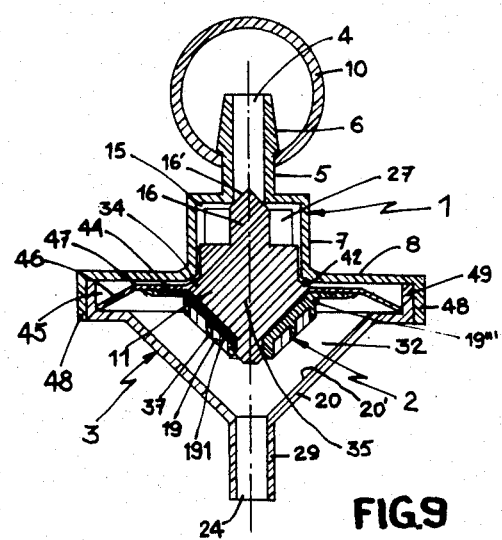
FIGS. 9 to 12 are cross-sections of a third embodiment of a dripper according to this invention showing the closing element in four different positions.

In the closed position of the dripper shown in FIG. 9, the radial elastic arms 44 have a rectilinear part which is substantially parallel to the flange 8 and an end part 46 which is bent (47) toward the upper part of the frusto-conical closing element.

Figure 14:
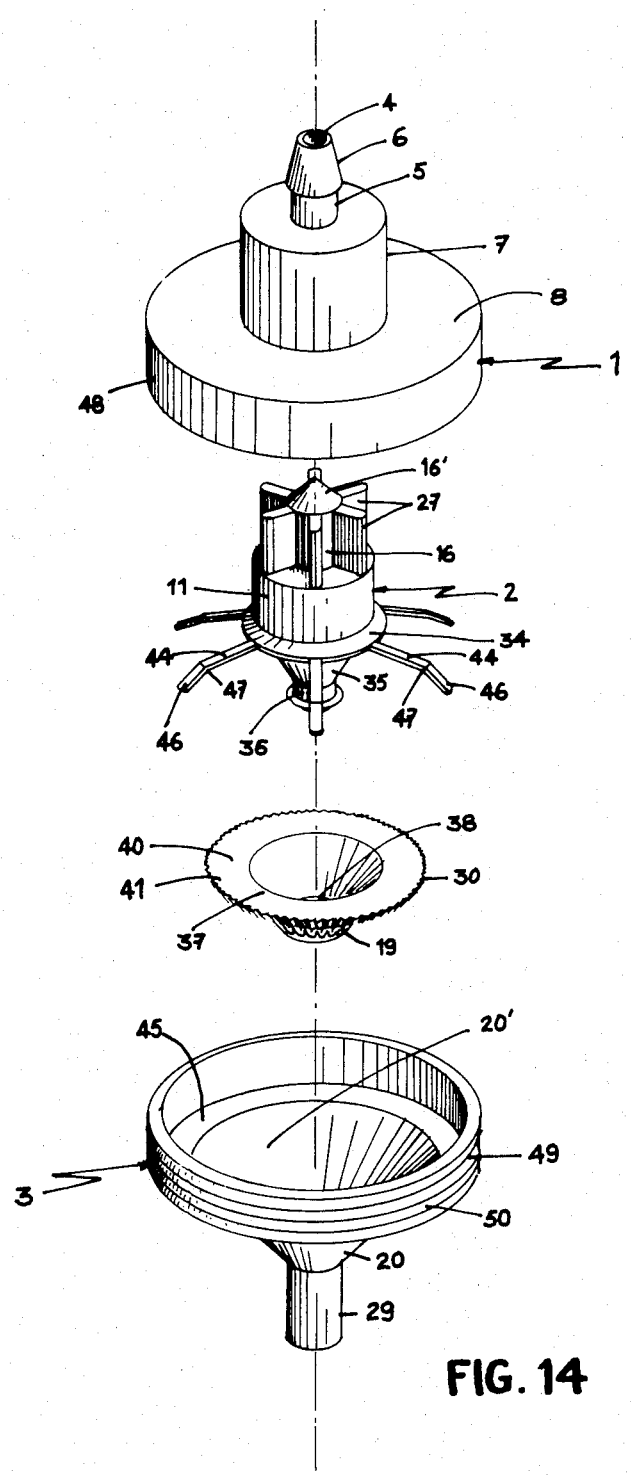
FIG. 14 is an exploded perspective view of the third embodiment shown in FIGS. 9 to 12 of the dripper according to this invention.

In the embodiment of the dripper shown in FIGS. 9 to 12 and 14, the cover 5, 7, 8 has a skirt 48 having an inner screwed face which is screwed on the cylindrical upper flange 49 fixed to the wall 20 of the envelope 3, said upper flange 49 being provided with outer threads 50, as shown in FIG. 14.

Figure 10:
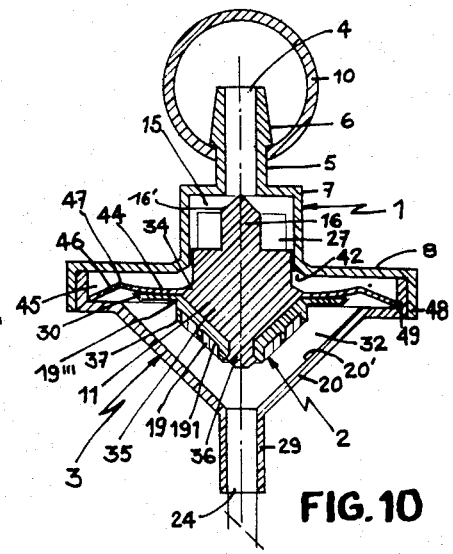
Figure 11:
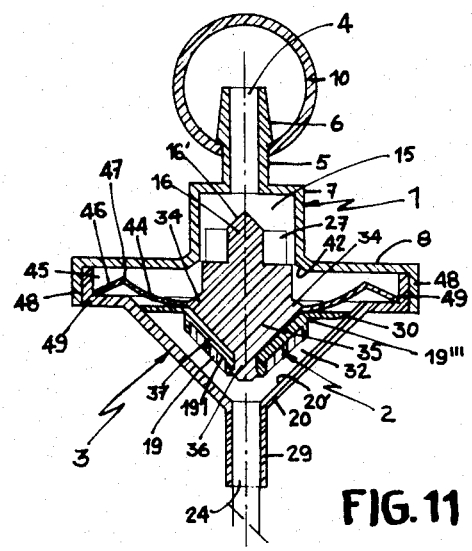
Figure 12:
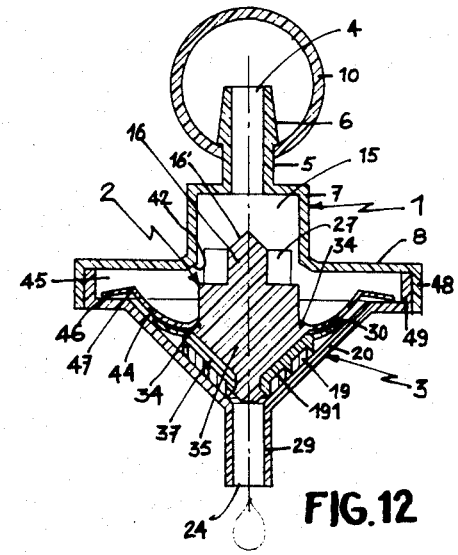

FIG. 9 shows the dripper in closed position, its closing element 11 being maintained by the radial arms 44 against the seats adjacent to the inlet 4. FIGS. 10 and 11 show the dripper when it becomes open and FIG. 12 shows the dripper in the operating position. In this latter position, the flexible membrane 37 carried by the closing element 11 is applied against the inner face 20' of the frusto-conical wall 20 of the envelope 3. FIGS. 9 to 12 show the various positions of the closing member 11, of the elastic radial arms 44 and of the membrane 37.

Figure 15:
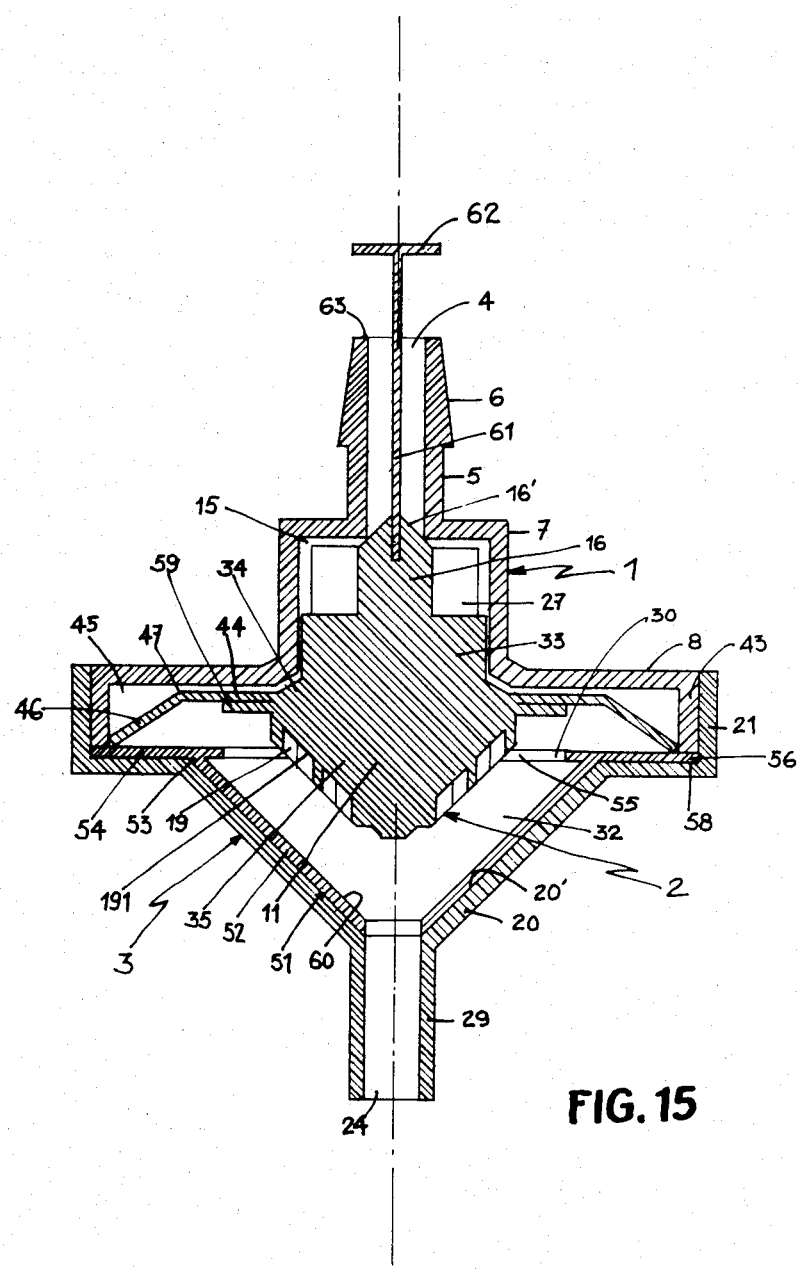
FIG. 15 is a cross-section of a fourth embodiment of a dripper according to the invention.
Figure 16:
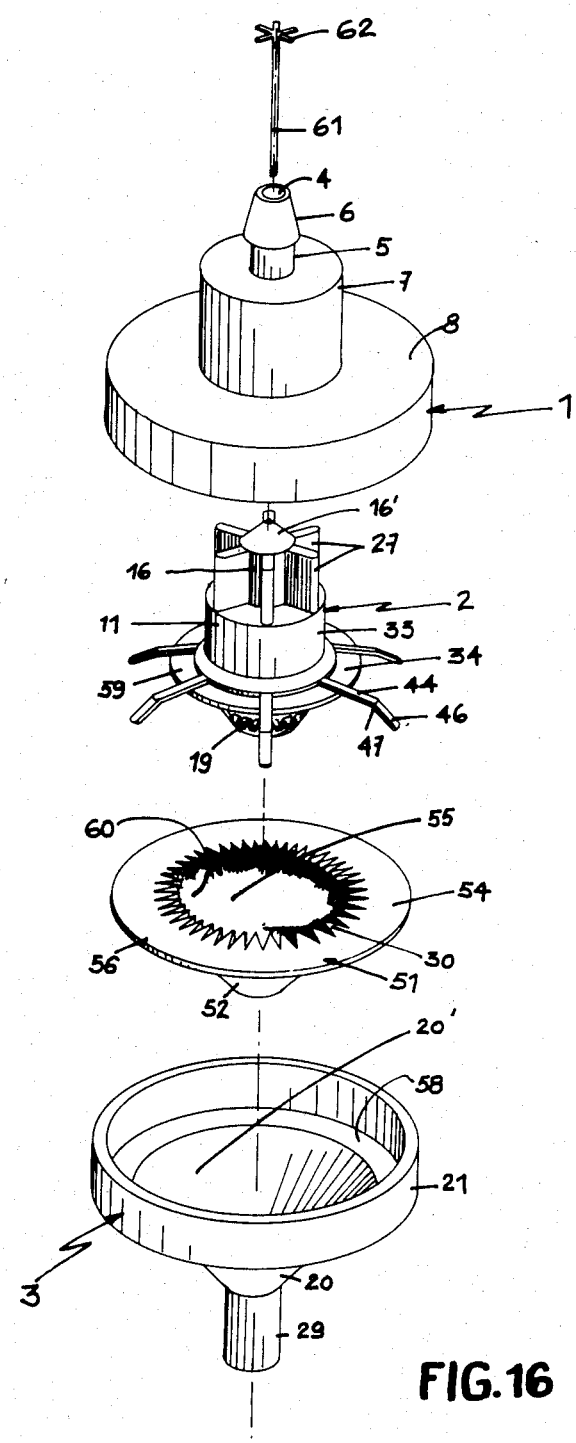
FIG. 16 is an exploded perspective view of the dripper shown in FIG. 15.

FIGS. 15 and 16 show a fourth embodiment of a dripper according to the invention. This dripper comprises a deformable or flexible membrane 51 comprising a part 52 having the shape of an inverted cone frustum, the upper edge 53 of part 52 being attached to a plate or flange 54 in which a central circular hole 55 is provided. The edge of this hole 55, which has a lower diameter than the diameter of the large base of part 52 of the membrane 51, is provided with filtering notches 30. The membrane 51 is applied on the inner face 20' of the side wall 20 of the envelope 3, when the dripper is in the operating position. The outer edge 56 of the flange 54 is inserted between the lower edge 57 of the skirt 43 of the cover 5, 7, 8 and the bottom 58 of the cylindrical flange 21 attached to the frusto-conical wall 20.

As shown in FIG. 15, the part of the flange 54, which is located outside the frusto-conical wall 52 of the membrane, rests permanently on the bottom 58 of the flange 21.

The closing element 11 is similar to that of FIGS. 9 to 12 and 14, except that it is provided with a rigid ring 59 at the level of its frusto-conical part 34 connecting the cylindrical part 33 and the frusto-conical part 35. Said ring 59 masks partially the notches 30 provided in the edge of the circular hole 55 of the flange 54 of the membrane 51, when the dripper is in the operating position. Thus, the partially masked notches act as filters, the circular hole 55 of the flange 54 being closed by the movable closing member 11.

The part 35 having the shape of an inverted cone frustum of the rigid closing element 11 is provided, on its lateral face, with a sinuous groove 19 similar to that shown in perspective in FIG. 13. When the dripper is in the operating condition, the grooved lateral face of the frusto-conical part 35 of the closing member 11 is applied on the inner face 60 of the frusto-conical part 52 of the deformable membrane 51, so that said sinuous groove 19 forms a tortuous conduct, through which the liquid filtered through the notches 30 may flow, so as to leave the dripper drop by drop or as a microjet through the outlet 24.

As shown in FIGS. 15 and 16, the shank 16 of the closing member 11 carries a rod 61 which extends axially through the inlet 4 and carries at its free end a pre-filter 62 having a diameter which is larger than the diameter of said inlet 4. When the dripper is not in use, as shown in FIG. 15, the pre-filter 62 is removed from the free end 63 of the inlet 4. On the other hand, when the dripper is in the use position, i.e. when the closing element 11 is in the position shown in FIGS. 3 and 12, the pre-filter 62 is applied against the free end 63 of the inlet 4 and filters the large impurities contained in the liquid under pressure admitted in the dripper. The pre-filter 62 may consist of a sieve or diametral bars which stop large particles, such as vegetable fragments, from entering into the dripper.

Figure 17:
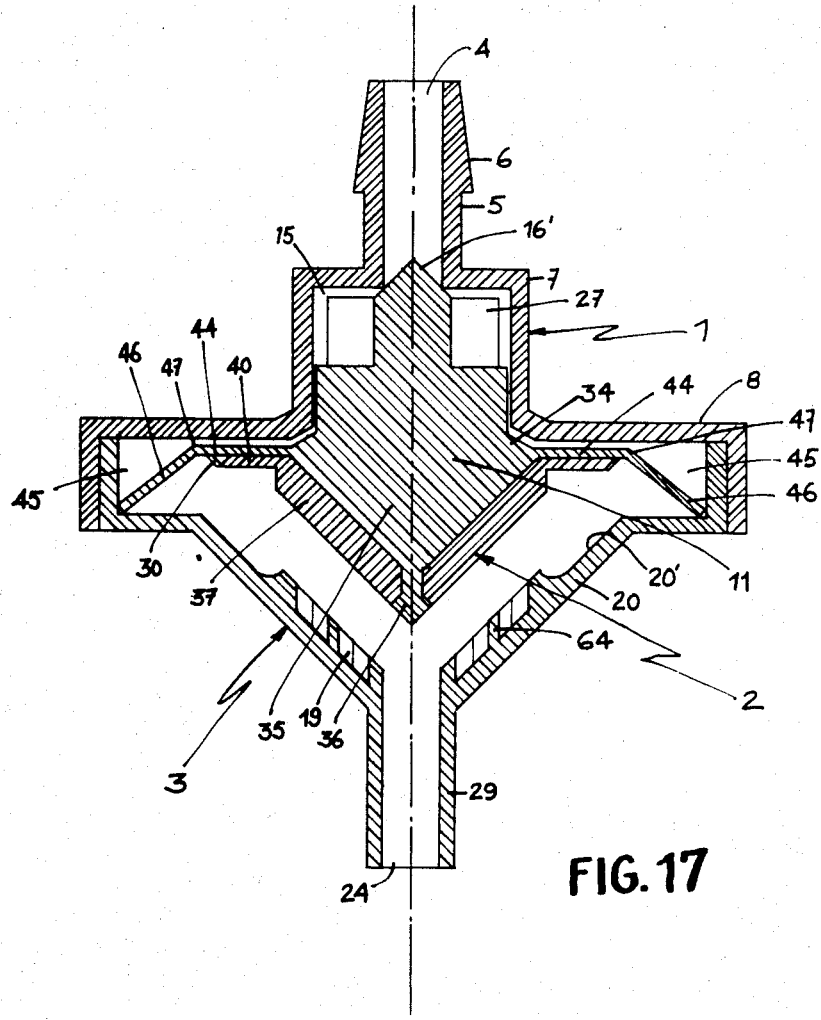
FIG. 17 is a cross-section of a fifth embodiment of the dripper according to this invention.

FIG. 17 shows a fifth embodiment of a dripper according to this invention. In this dripper, which is similar to that shown in FIGS. 9 to 12 and 14, the flexible membrane 37 has, in its frusto-conical part 39, a smooth outer surface toward the passage 32, whereas a sinuous groove 19 is provided in a thickened portion 64 of the wall 20.

What I claim is:

1. A distributor or dripper for the micro-irrigation of soils comprising:

a housing for an inner chamber, said chamber having a first portion provided with an inlet for connection to a conduit of irrigation liquid and a first seat adjacent said inlet, and a second portion downstream of said first portion and provided with an outlet and a second seat adjacent said outlet, said second portion having a frusto-conical wall near the outlet;

a closing member which is movable in said chamber between at least a first position adjacent said first seat, a second position adjacent said second seat and a third position between said first and second positions;

first and second members disposed in said chamber, said first and second members being separated from one another in said first position of said closing member so that the irrigation liquid in said chamber can freely flow toward the outlet, said first and second members meeting to form a filter which allows a flow of irrigation meeting to form a filter which allows a flow of irrigation liquid toward the outlet, but retains particles contained in said liquid, when said closing member is in its third position, and one of said first and second members flexing during movement of said closing member from said third position to said second position to allow movement of said closing member from said third position to said second position while maintaining said filter; and means for returning said closing member to said first position when the pressure of the irrigation liquid is lower than a predetermined value.

2. A dripper according to claim 1, wherein said closing member has a diameter which decreases toward said outlet, and in which said first member comprises an array of notches provided in the periphery of the part having the largest diameter of the closing member.

3. A dripper according to claim 2, in which the closing member is provided, in its part having the largest diameter, with a flexible lip, the free peripheral edge of said lip being provided with said notches separated by teeth.

4. A dripper according to claim 3, in which the closing member is provided between its large base and its small base, and downstream of the lip, with a peripheral groove which forms a chamber connected to said dripping groove.

5. A dripper according to claim 1, wherein said first member is carried on said closing member and in which the closing member has a smooth surface downstream of said first member to be applied on the seat adjacent to the outlet and in which said seat is provided with a groove which, in cooperation with said smooth surface, forms a continuous channel having such a profile that the liquid flowing therein is subjected to several direction changes, one end of said groove having an opening directed toward the inlet, whereas the other end of said groove has an opening directed toward the outlet.

6. A dripper according to claim 1, in which the closing member has a frusto-conical shape with a large base directed toward said inlet.

7. A dripper according to claim 6, in which the seat adjacent to the outlet has a frusto-conical shape and the apex angle of the cone generating said seat is equal to the apex angle of the cone generating the closing member.

8. A dripper according to claim 1, in which the closing member includes a shank guided in a sheath provided in said chamber downstream from the inlet of said chamber.

9. A dripper according to claim 8, in which peripheral fins are provided on at least a part of the height of the shank carried by the closing member.

10. A dripper according to claim 9, in which the shank carried by the closing member has a substantially cylindrical shape and the peripheral fins of the shank are radial or helical.

11. A dripper according to claim 8, in which said shank has a cylindrical shape corresponding to that of said sheath on a part of the height of said shank, the latter being provided with fins on the remaining part of its height.

12. A dripper according to claim 8, in which the shank carries a conical or frusto-conical head which is applied onto the seat adjacent to the inlet, when the closing member is in the first position.

13. A dripper according to claim 1, in which the means for retaining the closing member against said first seat consist of a permanent magnet acting on a ferromagnetic material.

14. A dripper according to claim 13, in which the closing member includes a shank guided in a sheath provided in said chamber downstream from the inlet of said chamber and said sheath adjacent to the inlet contains a magnet or magnetized particles dispersed in an inert material, whereas the closing member and/or its shank is at least partially made of a ferro-magnetic material.

15. A dripper according to claim 13, in which the closing member is provided with projections which are oriented in such a way that they cause the closing member to rotate during its displacement from the first seat toward the second seat.

16. A dripper according to claim 1, in which said elastic means consist of radial elastic arms acting as snapping springs, one end of said arms being attached to the closing member whereas the free end of said arms bears against a circular recess provided in said chamber, said radial elastic arms urging permanently the closing element toward said first seat and thus inhibiting any liquid flow through the dripper, as long as the pressure of this liquid is less than a level determined by the elasticity of the radial arms.

17. A dripper according to claim 16, in which the radial arms connected to the closing member comprise a part which, when the dripper is closed, is rectilinear and substantially parallel to the large base of the closing member, as well as an end part which is bent toward the upper part of the closing member.

18. A dripper according to claim 1, further comprising a dripping groove provided downstream of said filter and forming a channel having one end collecting the irrigation liquid passing through said filter and another end discharging the liquid into said outlet, said groove having such a profile that the filtered liquid is submitted therein to several direction changes.

19. A dripper according to claim 1, wherein said first member comprises a membrane surrounding at least a portion of said closing member within said chamber, said membrane having a hole therein with an array of notches around the periphery thereof, said second member being movable with said closing member toward said notches as said closing member moves from said first position to said second position.

20. A dripper according to claim 19, in which said membrane has a frusto-conical shape and is fixed to said second seat, said hole being formed in a part of said membrane having the largest diameter.

21. A distributor or dripper for the micro-irrigation of soils comprising:
- a housing for an inner chamber, provided with an inlet for connection to a conduit of irrigation liquid and also provided with an outlet, said chamber having a cylindrical wall near the inlet and a frusto-conical wall near the outlet, the large base of the frusto-conical wall being adjacent to the cylindrical wall and having a diameter which is smaller than that of said cylindrical wall;
- a closing member which is movable in said chamber between a first seat adjacent to said inlet and a second seat adjacent to said outlet, said closing member being provided with guiding means;
- an elastic circular membrane carried by said closing member and having a diameter which is smaller than that of the cylindrical wall of the chamber, so that the irrigation liquid can flow toward the outlet around the periphery of said membrane when the latter is in the part of the chamber surrounded by said cylindrical wall, the membrane being provided with a circular array of notches separated from each other by teeth, so that said notches act as filters which allow a flow of irrigation liquid toward the outlet, but retains particles contained in said liquid, when said membrane is in the part of the chamber surrounded by said frusto-conical wall and is in contact with this frusto-conical wall, said membrane contacting said frusto-conical wall during movement of said closing member toward said frusto-conical wall but before said closing member reaches said frusto-conical wall, said membrane flexing to allow said closing member to continue movement toward said frusto-conical wall after said membrane has contacted said frusto-conical wall;
- a dripping groove provided downstream of said membrane and forming a channel having one end collecting the irrigation liquid filtered through the filtering notches and another end discharging the liquid into said outlet, said groove having such a profile that the filtered liquid is submitted therein to several direction changes, and
- elastic means for returning the closing member from the seat adjacent to the outlet to the seat adjacent to the inlet, when the pressure of the irrigation liquid is lower than a value determined by the elasticity of said elastic means.

22. A distributor or dripper for the micro-irrigation of soils, comprising:
- a housing (3) for an inner chamber, provided with an inlet (4) to be connected to a conduit of irrigation liquid under pressure and also provided with an outlet (24);
- a closing member (11) contained in said chamber and movable by the irrigation liquid between seats (14, 20') which are respectively adjacent to said inlet (4) and outlet (24) in said housing, a fluid passage being formed between said closing member and housing when said closing member contacts said seat adjacent to said outlet;
- an annular passage (22,32) defined by the closing member (11) and the seat (20') adjacent to the outlet (24), for allowing the rising of the dripper or distributor by the said liquid during the movement of the closing member (11), in said chamber, from the seat (20') adjacent to the outlet (24) toward the seat (14) adjacent to the inlet (4) and vice-versa, and
- means (44) for retracting the closing member (11) toward the seat (14) adjacent to the inlet (4), when the pressure of said liquid falls below a predetermined value,
- characterized in that said distributor or dripper also comprises, in one of the surfaces defining said annular passage (22,32) between the closing member (11) and the seat (20') adjacent to the outlet (24), a circular array of notches (30) which are upstream of said fluid passage and are capable of contacting the other of said surfaces defining said annular passage and filtrating the irrigation liquid by retaining particles (31) of predetermined size contained in said liquid, over a range of movement of said closing member (11) near said seat (20') adjacent to the outlet (24).

23. A distributor or dripper according to claim 22, characterized in that said chamber has an inverted frusto-conical wall near said outlet (24) and the closing member (11) has also at least partly the shape of an inverted cone frustum, said notches (30) being provided in the part of greatest diameter of the frusto-conical closing member (11).

24. A distributor or dripper according to claim 22, wherein a membrane (51) is applied on the seat (20') adjacent to the outlet (24) of said housing (3"), characterized in that said notches (30) are provided in the edge of a circular hole (55) of said membrane.

25. A distributor or dripper for the micro-irrigation of soils, comprising:
- a housing for an inner chamber, said chamber having a first portion provided with an inlet for connection to a conduit of irrigation liquid and a first seat adjacent said inlet, and a second portion downstream of said first portion and provided with an outlet and a second seat adjacent said outlet, said second portion having a frusto-conical wall near the outlet;
- a closing member which is movable in said chamber between at least a first position adjacent said first seat, a second position adjacent said second seat and a third position between said first and second positions;
- first and second members disposed in said chamber, said first and second members being separated from one another in said first position of said closing member so that the irrigation liquid can freely flow toward the outlet, said first and second members meeting to form a filter which allows a flow of irrigation liquid toward the outlet, but retains particles contained in said liquid, when said closing member is in its third position; and
- means for returning said closing member to said first position when the pressure of the irrigation liquid is lower than a predetermined value.

* * * * *